United States Patent Office 3,390,324
Patented June 25, 1968

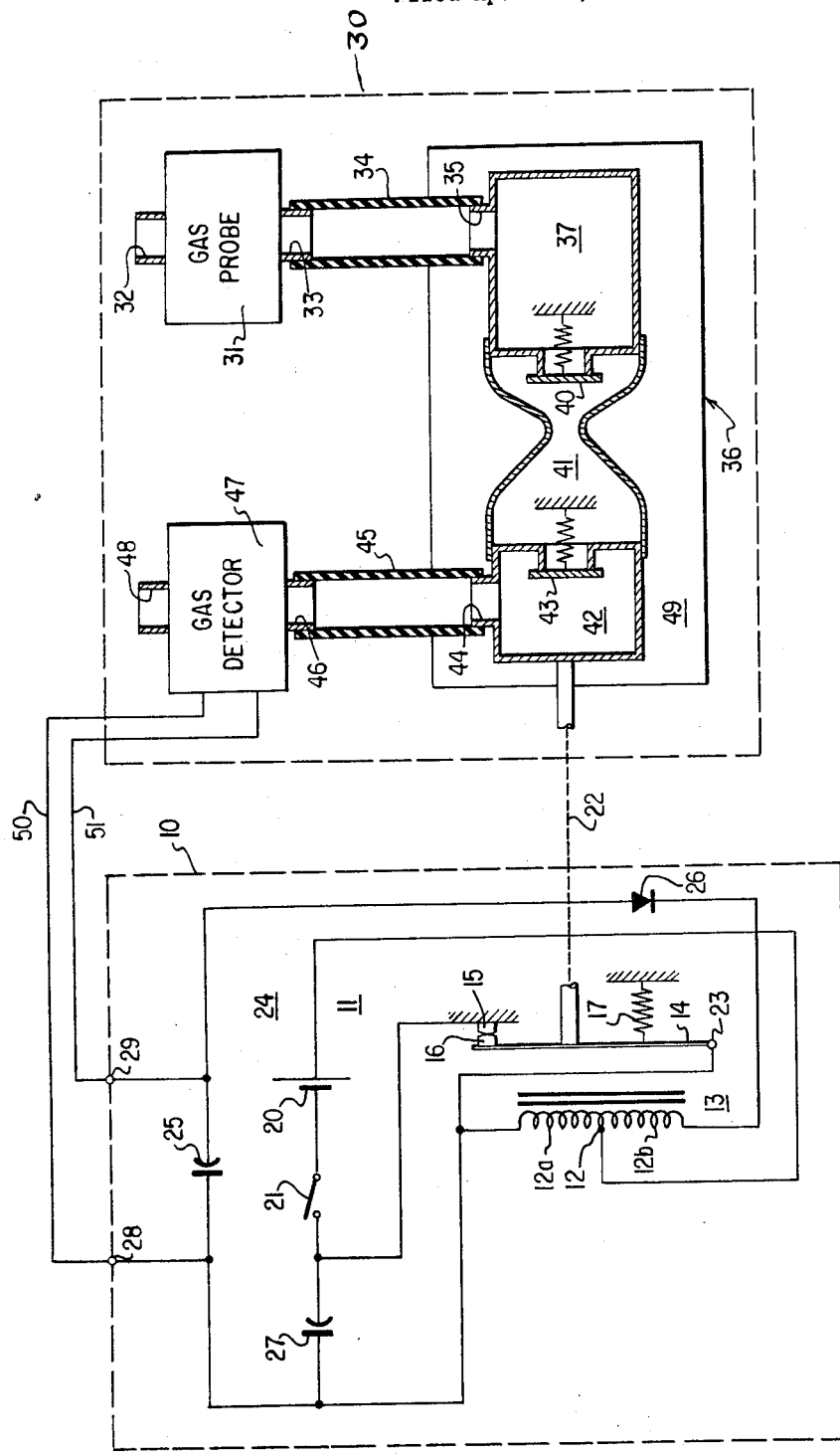

3,390,324
LEAK DETECTING SYSTEM WITH ENERGY
CONVERSION MEANS
John A. Roberts, Lynnfield Center, Mass., assignor to
General Electric Company, a corporation of New York
Filed Apr. 11, 1966, Ser. No. 541,586
13 Claims. (Cl. 324—33)

ABSTRACT OF THE DISCLOSURE

Means connected to a direct current source for energizing electronic circuitry and driving a pump in a leak detector system. Normally closed relay contacts on an armature in series with the relay winding permit energization thereof to open the relay contacts, deenergize the winding and close the contacts. The oscillating armature drives the pump. Opening the contacts discharges the relay winding energy through another winding in series into a capacitor to energize the circuitry.

This invention is directed to an energy source and more particularly to a source which converts an electrical energy input to a mechanical energy output and an electrical energy output.

Portable testing equipment developments have required that various portable power supplies and portable motive drive means be produced. One exemplary area is in the development of detectors used to detect leaks in closed systems such as refrigeration systems by sensing the escape of a tracer gas within the system. These leak detectors are well known in the art as indicated by Patent 3,065,411, "Leak Detector Indicating Circuit," issued Nov. 20, 1962, Patent 3,071,722, "Leak Detector," issued Jan. 1, 1963, and Patent 3,076,139, "Leak Detector," issued Jan. 29, 1963, and all assigned to the same assignee as the present invention. However, these and other prior art systems have all been non-portable and therefore have used pumps having stationary motive driving means and electronic circuitry having stationary power supplies.

It is an object of this invention to provide a portable energy source capable of providing both mechanical and electrical energy outputs.

Another object of this invention is to provide a portable energy source which converts energy from a low voltage direct current electrical energy source to a reciprocating motive energy output and a high voltage direct current output.

Briefly stated, this invention utilizes two circuits, a magnetic energy producing and storage means and switching means selectively coupling the circuits to the magnetic energy producing and storage means. Energization of the magnetic energy producing and storage means by a first circuit causes magnetic energy to be produced by a low voltage D-C source connected in series with the magnetic energy producing and storage means and simultaneously shifts the switching means from its normally conductive state to a non-conductive state to thereby switch the magnetic energy producing and storage means from the first circuit to a second circuit. When the switching means shifts to a non-conductive state, the second circuit discharges stored energy through a unidirectional energy transfer means into a charge storage means until the energy level in the magnetic energy producing and storage means reaches a level at which the switching means again assumes a conductive state. So long as the low voltage direct current energy source is coupled to the circuit, the operation repeats.

The switching means includes a mechanical element which oscillates during this alternate energization and de-energization of the magnetic energy producing and storage means, and means are connected to the mechanical element for producing the mechanical energy output in the form of reciprocating motive energy. In addition, means are also provided to take the electrical energy from the charge storage means as a high direct current voltage.

This invention has been pointed out with particularity in the appended claims. A more thorough understanding of the above and further objects and advantages of the invention can be obtained by reference to the following description taken in conjunction with the accompanying drawing which shows an energy conversion source embodying this invention used in conjunction with a portable leak detector.

An energy conversion means 10 comprises a first circuit 11 for energizing a magnetic enery producing and storage means such as a coil 12 of a relay 13. Relay 13 additionally includes an armature 14, a stationary contact 15, a movable contact 16 affixed to armature 14 and spring means 17 for maintaining relay contacts 15 and 16 in a normally closed position. As will be obvious to those skilled in the art, a solenoid can be substituted for relay 13 with the solenoid energizing coil being substituted for relay coil 12 and the solenoid plunger being substituted for relay armature 14 and having a movable contact 16 connected thereto. Relay coil 12 has two portions 12a and 12b; relay portion 12a is connected in series with a battery 20, stationary contact 15, movable contact 16, and armature 14 by a manually operable switch 21. When switch 21 is closed, current flows from battery 20 through relay coil portion 12a, armature 14, movable contact 16, stationary contact 15 and manually operable switch 21 back to battery 20. As the current reaches a value which produces a sufficient magnetic field, relay armature 14 is attracted to relay coil 12 to thereby open the contacts 15 and 16 and de-energize the relay coil 12. Means for converting the oscillating motion of armature 14 about a pivot 23 to a linear output motion are well known in the art and are represented by a dotted line 22.

When relay contacts 15 and 16 separate, a second circuit 24, including a charge storage means such as a capacitor 25 and a unidirectional transfer means such as a diode 26, is switched into a series circuit with relay coil 12. Diode 26 is poled so that the energy stored in relay coil portion 12a during the energization thereof can discharge through diode 26 to thereby charge capacitor 25. Relay coil portions 12a and 12b are connected in a series relationship so that the changing magnetic field caused by the collapse thereof when coil portion 12a is de-energized couples both portions 12a and 12b to thereby produce a larger voltage. The use of a relay coil portion 12b is optional, however, as it merely acts as a transformer secondary and the number of secondary turns is dependent upon output voltage requirements. If a low voltage is required, then relay coil portion 12a might be sufficient. The larger voltage causes a current to flow through the capacitor 25 and diode 26 until the stored energy is transferred to capacitor 25.

A capacitor 27 is connected across relay contacts 15 and 16 to act as a buffer capacitor and as an arc reducing means to increase the life of relay contacts 15 and 16. Capacitor 27 also tends to increase the voltage across capacitor 25 which is coupled from capacitor 25 by terminals 28 and 29.

One particular application of this to which the energy conversion means 10 is particularly adapted is that of a portable leak detector designated by numeral 30 in the drawing including elements well known in the art. A probe 31 having an inlet port 32 takes air samples and transfers them through an outlet port 33 and a coupling tube 34 to the inlet port 35 of a pump shown as a reciprocal pump 36 which is particularly adapted for connection to the energy conversion means 10. Inlet port 35 communicates with the interior of a first chamber 37 which includes a valve means 40 for admitting air from first chamber 37 to a second, expansible chamber 41 when the pressure within expansible chamber 41 is less than that in chamber 37. Air is similarly transferred to a third chamber 42 with a similar valve means 43 when the pressure in expansible chamber 41 exceeds that in chamber 42. Air in chamber 42 is transferred through a pump outlet port 44 and a coupling tube 45 to the inlet port 46 of an electronic detector 47 and then through the detector 47 and to be exhausted through an outlet port 48. Chamber 42 is mounted for reciprocal motion on a support means 49 of pump 36 and is connected to armature 14 by motion conversion means 22. Chamber 42 is moved toward first chamber 37 when armature 14 is returned to its normal position by spring means 17; and air in the contracting expansible chamber 41 is forced into chamber 42 through valve means 43. When coil 12 is then energized and armature 14 is oscillated back to an open-contact position, valve means 43 closes and valve means 40 opens so that air in chamber 37 is forced into expansible chamber 41. As this operation continues, and samples are taken by probe 31 and subsequently moved through the reciprocal pump 36 to the gas detector 47.

As is well-known in the art and is evidenced by the above-mentioned patents, detector 47 is generally an electronic device requiring a high voltage power supply. When conductors 50 and 51 are connected to terminals 28 and 29 respectively, then, for a proper value of capacitor 25, the voltage at terminals 28 and 29 is sufficient to energize gas detector 47.

Typical operating constants for such a circuit include:

Relay coil portion:
    12a _____turns__ 280
    12b _____do____ 1000
DC power supply 20 _____volts__ [1] 1.2
Capacitor:
    25 _____μfd__ 0.1
    27 _____μfd__ 0.005

[1] 0.7 ampere battery.

An energy conversion means 10 utilizing these components can produce at output voltage at terminals 28 and 29 of 250 volts D.C. at 50 microamperes. This is sufficient to energize a portable leak detector gas detector 47.

Briefly summarizing, a specific embodiment of an energy conversion means capable of producing a reciprocating mechanical energy and a high voltage electrical energy has been shown wherein a switching means such as a relay performs two basic functions. Means are provided to convert the oscillating motion of an armature to reciprocating motion capable of driving a reciprocating load. Energization of the coil is controlled by contacts on the relay armature which are normally closed. When a relay coil is energized, the contacts open thereby de-energizing the relay coil so that the contacts close; and the contacts continue to alternately make and break as long as energy is supplied from a low voltage DC source. Magnetic energy produced and stored in the relay coil during the periods when the contacts of the relay are closed discharges in a unidirectional manner and transfers the electrical energy to a capacitor so that a high DC voltage can be taken from the capacitor to supply an electronic circuit.

The foregoing is a description of illustrative embodiments of the invention and it is the intention in the appended claims to cover all forms which fall within the scope of the invention.

What is claimed as new and desired to be obtained by Letters Patent of the United States is:

1. An energy conversion means for converting direct current electrical energy from a source thereof to an electrical energy output and a mechanical energy output adapted to be coupled to a utilization device comprising:
   (a) normally conductive switching means, said switching means including an oscillating member for shifting said switching means between the conductive and non-conductive states,
   (b) magnetic energy producing and storage means connected to the direct current energy source by said switching means when said switching means is conductive, said magnetic energy producing and storage means causing said switching means to assume a non-conducting state when energized,
   (c) charge storage means,
   (d) unidirectional energy transfer means in series with said magnetic energy producing and storage means and said charge storage means to constitute a second circuit, said magnetic energy producing and storage means being switched in series with said second circuit by said switching means when said switching means assumes a non-conducting state, said magnetic energy producing and storage means discharging through said unidirectional energy transfer means into said charge storage means when said switching means assumes a non-conducting state,
   (e) means connected to said charge storage means for coupling the electrical energy produced at said charge storage means therefrom, and
   (f) means connected to said oscillating member in said switching means and adapted to be connected to the utilization device for converting oscillating motion thereof to a mechanical energy output for the utilization device.

2. An energy conversion means as recited in claim 1 wherein said switching means is constituted by movable and stationary relay contacts, wherein said oscillating member is constituted by a relay armature, said relay armature being connected to said movable contacts and wherein said magnetic energy producing and storage means is constituted by a relay coil.

3. An energy conversion means as recited in claim 2 wherein said relay coil includes first and second portions connected in series aiding relationship, said first portion being energized when said relay contacts are closed and said second portions being connected in series with said second circuit when said relay contacts are open.

4. An energy conversion means as recited in claim 2 wherein said charge storage means is constituted by a capacitor and said unidirectional energy means is constituted by a diode, said capacitor and said diode being connected in series with said relay coil to conduct current when said relay contacts are open to thereby transfer energy stored in said relay coil to said capacitor.

5. In a system for detecting leaks of a tracer gas including a reciprocal pump means, an electronic detecting means and means for directing the gas between the pump means and the detector means, the improvement of a portable energy conversion means for driving the reciprocal pump means and energizing the electronic detector means adapted to be energized by a low voltage direct current energy source including,
   (a) normally conductive switching means, said switching means including an oscillating member for shifting said switching means and between the conductive and non-conductive states,
   (b) magnetic energy producing and storage means connected to the direct current energy source by said switching means when said switching means is conducting, said magnetic energy producing and storage means causing said switching means to assume a non-conducting state when said magnetic energy producing and storage means is energized by the low voltage direct current energy source,
   (c) charge storage means,
   (d) unidirectional energy transfer means in series with said magnetic energy producing and storage means and said charge storage means to constitute a second circuit, said magnetic energy producing and storage means being switched in series with said second circuit by said switching means when said switching means assumes a non-conducting state, said magnetic energy producing and storage means discharging through said unidirectional energy transfer means into said charge storage means, (e) terminal means connected to said charge storage means for coupling the high voltage produced at said charge storage means to the electronic detecting means, and (f) means connected to said oscillating member in said switching means for converting the motion of said oscillating member to a reciprocal motion, said means being connected to the reciprocal pump means.

6. In a system for detecting leaks as recited in claim 5 an energy conversion means wherein said switching means is constituted by movable and stationary relay contacts, wherein said oscillating member is constituted by a relay armature, said relay armature being connected to said movable relay contacts and wherein said magnetic energy producing and storage means is constituted by a relay coil.

7. A leak detecting system as recited in claim 6 wherein said relay coil includes first and second portions, said first portion being connected in series with the energy source when said relay contacts are closed and said first and second portions being connected in series with said second circuit when said relay contacts are open.

8. A leak detecting system as recited in claim 6 wherein the low voltage direct current energy source comprises a direct current power supply and manually operated switch in series, said relay coil being energized when the manually operated switching device is closed and said relay contacts being opened in response to energization of said relay coil.

9. A system for detecting leaks as recited in claim 8 wherein said charge storage means is constituted by a capacitor and said unidirectional energy transfer means is constituted by a semiconductor diode, said semiconductor diode and said capacitor being connected in series with said relay coil, said semiconductor diode being poled to transfer energy from said relay coil to said capacitor when said relay contacts are opened and wherein said terminal means are connected across said capacitor.

10. A system for detecting leaks as recited in claim 9 wherein a second capacitor is connected across said relay contacts.

11. A system for detecting leaks of a tracer gas comprising:

(a) probe means having inlet and outlet ports for taking a sample of a gas to be tested, (b) a pump having first, second and third chambers in series, said second chamber being expansible in communicating with said first and third chambers, said first chamber having means for detecting air thereto from said probe means, said third chamber being movable with respect to said first chamber for alternately expanding and contracting said second chamber and valve means connected with said first and third chambers for admitting air to said third chamber from said second chamber when said second chamber expands and for admitting air from said first chamber to said second chamber when said second chamber contracts, (c) a relay including contacts, an armature for opening said contacts and a relay coil, said armature being connected to said third chamber to cause the reciprocal motion of said third chamber, (d) a DC source in series with said relay coil and said relay contacts to constitute a first circuit to energize said relay coil and thereby displace the armature and open said contacts, (e) a capacitor in series with a rectifier and said relay coil to constitute a second circuit energized by said coil when said armature is moved, and (f) electronic detector means having an air inlet port and terminal means for connection to a voltage source, said inlet port being connected to an outlet port of said third chamber and said terminal means being connected across said capacitor.

12. A system as recited in claim 11 wherein a second capacitor is connected in parallel with said relay contacts to substantially eliminate arcing of said contacts.

13. A system as recited in claim 11 wherein said relay coil includes first and second portions in a series aiding relationship, said first portion being connected in series with said first circuit when said relay contacts are closed and said first and second portions being connected in series with said second circuit when said relay contacts are open.

References Cited

UNITED STATES PATENTS 2,579,352  12/1951  White _____ 324—33
3,160,809  12/1964  Vanderschmidt _____ 324—33

RUDOLPH V. ROLINEC, *Primary Examiner.*

C. F. ROBERTS, *Assistant Examiner.*